United States Patent
Yonekawa et al.

(10) Patent No.: US 11,004,018 B2
(45) Date of Patent: May 11, 2021

(54) LOGISTICS PREDICTION SYSTEM AND PREDICTION METHOD

(71) Applicant: HITACHI TRANSPORT SYSTEM, LTD., Tokyo (JP)

(72) Inventors: Akira Yonekawa, Tokyo (JP); Junichi Hirayama, Tokyo (JP); Daichi Ojiro, Tokyo (JP); Koji Ara, Tokyo (JP); Yoshihito Shimazu, Tokyo (JP)

(73) Assignee: HITACHI TRANSPORT SYSTEM, LTD., Tokyo (JP)

( * ) Notice: Subject to any disclaimer, the term of this patent is extended or adjusted under 35 U.S.C. 154(b) by 216 days.

(21) Appl. No.: 16/439,368

(22) Filed: Jun. 12, 2019

(65) Prior Publication Data
US 2019/0385098 A1 Dec. 19, 2019

(30) Foreign Application Priority Data
Jun. 13, 2018 (JP) .............................. JP2018-113050

(51) Int. Cl.
G06Q 10/04 (2012.01)
G06Q 10/08 (2012.01)
G06F 17/18 (2006.01)

(52) U.S. Cl.
CPC ............ *G06Q 10/04* (2013.01); *G06F 17/18* (2013.01); *G06Q 10/0838* (2013.01)

(58) Field of Classification Search
CPC .... G06Q 10/0838; G06Q 10/04; G06Q 10/06; G06F 17/18
See application file for complete search history.

(56) References Cited

U.S. PATENT DOCUMENTS

2004/0254826 A1* 12/2004 Yang ...................... G06Q 10/08
705/28
2008/0059284 A1* 3/2008 Solotorevsky ..... G06Q 10/0639
705/7.38
(Continued)

FOREIGN PATENT DOCUMENTS

JP   H07-078209 A   3/1995
JP   2013-131259 A  7/2013

OTHER PUBLICATIONS

Laouafi, Abderrezak et al.; "Online electricity demand forecasting based on an effective forecast combination methodology"; Jul. 2017; Electric Power Systems Research; vol. 148; 1-23 (Year: 2017).*

(Continued)

*Primary Examiner* — Kevin H Flynn
*Assistant Examiner* — Michael C Moroney
(74) *Attorney, Agent, or Firm* — Volpe Koenig

(57) ABSTRACT

A logistics prediction system includes an arithmetic device that executes a predetermined process, a storage device connected to the arithmetic device, a shipment information input section to which past shipment information is input, a constraint input section to which a calculation resource and a calculation time period are input as constraints for prediction, an integration prediction database holding shipment trends of products, a prediction method selector that selects a prediction method to be used to predict a shipment volume for each of the products from among multiple prediction methods so that the constraints input to the constraint input section are satisfied, multiple prediction method sections that predict shipment volumes using the prediction methods, an integrator that integrates the results of the prediction by the prediction method sections for each of the products, and (Continued)

a shipment prediction output section that outputs the result of the integration by the integrator.

7 Claims, 5 Drawing Sheets

(56) References Cited

U.S. PATENT DOCUMENTS

2015/0227859 A1\* 8/2015 Ames, II ................. G06F 17/18
                                                    705/7.11
2016/0232637 A1   8/2016 Motohashi et al.
2016/0380908 A1\* 12/2016 Larsson ................. H04L 67/10
                                                    709/226

OTHER PUBLICATIONS

Extended European Search Report dated Oct. 1, 2019 for the European Patent Application No. 19179247.2.

\* cited by examiner

FIG. 3
| DATE | PRODUCT CODE | SHIPMENT VOLUME |
|---|---|---|
| 2017/12/26 | 4904644 | 100 |
| 2017/12/26 | 4904649 | 50 |
| 2017/12/26 | 4904650 | 30 |
| 2017/12/27 | 4904532 | 70 |
| 2017/12/27 | 4904644 | 120 |
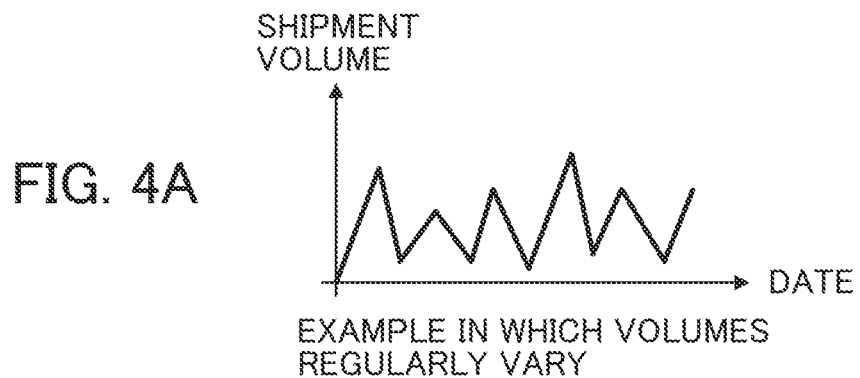
FIG. 4A
EXAMPLE IN WHICH VOLUMES REGULARLY VARY
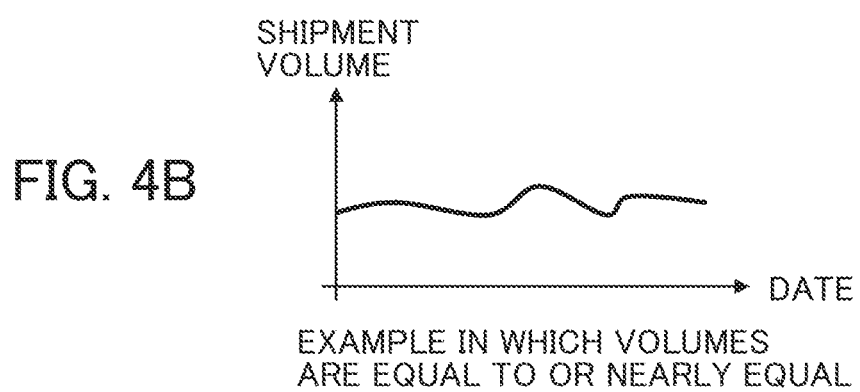
FIG. 4B
EXAMPLE IN WHICH VOLUMES ARE EQUAL TO OR NEARLY EQUAL
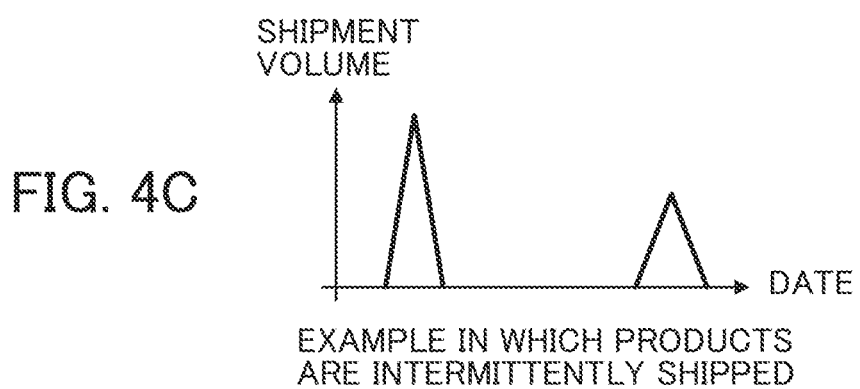
FIG. 4C
EXAMPLE IN WHICH PRODUCTS ARE INTERMITTENTLY SHIPPED

FIG. 5

| CALCULATION TIME PERIOD (SECONDS) | | |
|---|---|---|
| PREDICTION METHOD A | PREDICTION METHOD B | PREDICTION METHOD C |
| 5 | 1 | 3 |

FIG. 6

| PRODUCT CODE | PREDICTION ACCURACY (%) | | |
|---|---|---|---|
| | PREDICTION METHOD A | PREDICTION METHOD B | PREDICTION METHOD C |
| 4904644 | 80 | 60 | 50 |
| 4904649 | 80 | 60 | 40 |
| 4904650 | 70 | 70 | 50 |
| 4904532 | 60 | 30 | 80 |

LOGISTICS PREDICTION SYSTEM AND PREDICTION METHOD

CLAIM OF PRIORITY

The present application claims priority from Japanese patent application JP 2018-113050 filed on Jun. 13, 2018, the content of which is hereby incorporated by reference into this application.

BACKGROUND

The present invention relates to a logistics prediction system.

In a normal logistics prediction system, one or more shipment volume prediction and estimation methods are used to calculate a predicted value of a shipment volume based on input past shipment information.

As a background technique in this technical field, the following related-art techniques exist. Japanese Unexamined Patent Application Publication No. Hei07-78209 describes a shipment volume prediction system that causes a first predictor among multiple predictors to calculate actual predicted volumes, which are predicted shipment volumes based on annual changes, causes a second predictor among the multiple predictors to calculate predicted increased amounts, which are predicted shipment volumes based on changes for unit time periods such as months, causes a difference calculator to calculate differences between actual predicted volumes and actual shipment volumes for time periods for which the actual shipment volumes have been obtained and calculate differences between the predicted increased amounts and the actual shipment volumes, uses a prediction method determiner to treat an actual predicted volume as a predicted shipment volume when the actual predicted volume is smaller and treat a predicted increased amount as a predicted shipment volume when the predicted increased amount is smaller, based on the differences.

In addition, Japanese Unexamined Patent Application Publication No. 2013-131259 describes an integration demand prediction device that builds multiple demand prediction models and calculates predicted demands for the built demand prediction models based on actual demands stored in an actual demand storage unit storing past actual demands, calculates predicted differences for the multiple demand prediction models for a common time period based on the calculated predicted demands and the actual demands stored in the actual demand storage unit, calculates blend ratios, causing the calculated prediction differences to be in a predetermined prediction difference range, of the multiple demand prediction models for each of prediction time periods, and calculates a predicted demand for a predetermined prediction time period by multiplying the calculated blend ratios of the demand prediction models by the calculated predicted demands for the demand prediction models.

SUMMARY

In the technique described in Japanese Unexamined Patent Application Publication No. Hei07-78209, the calculation is executed using multiple prediction methods to predict shipment volumes of a large number of products and may not be terminated within a desirable time period in an environment of limited calculation resources. The technique described in Japanese Unexamined Patent Application Publication No. 2013-131259 is to predict a demand without predicting a shipment volume and is not to determine product characteristics, which are information specific to shipment prediction for logistics, and not to determine a prediction method (prediction model) based on a calculation resource.

The present invention has been made under such circumstances and aims to make the best use of a calculation resource and a calculation time period and execute prediction with high accuracy when shipment volumes of a large number of products are to be predicted.

A representative example of the present invention disclosed herein is as follows. That is, a logistics prediction system includes an arithmetic device that executes a predetermined process and a storage device connected to the arithmetic device. The logistics prediction system also includes a shipment information input section to which past shipment information is input, a constraint input section to which a calculation resource and a calculation time period are input as constraints for prediction, an integration prediction database holding shipment trends of products, a prediction method selector that selects a prediction method to be used to predict a shipment volume for each of the products from among multiple prediction methods, multiple prediction method sections that predict shipment volumes using the multiple prediction methods, an integrator that integrates the results of the prediction by the prediction method sections for each of the products, and a shipment prediction output section that outputs the result of the integration by the integrator.

According to an aspect of the present invention, shipment volumes of a large number of products can be predicted with high accuracy. Challenges, configurations, and effects other than the aforementioned challenges, configurations, and effects are clarified by a description of the following embodiment.

BRIEF DESCRIPTION OF THE DRAWINGS

FIG. 3 is a diagram showing data input to a shipment information input section;

FIGS. 4A to 4C are diagrams showing types of shipment trends of products;

FIG. 5 is a diagram showing an example of a configuration of a table in which time periods necessary for calculation to be executed using prediction methods are recorded;

FIG. 6 is a diagram showing prediction accuracy when prediction methods are applied to products;

DETAILED DESCRIPTION

Hereinafter, an embodiment of the present invention is described with reference to the accompanying drawings.

Embodiment

Figure 1:
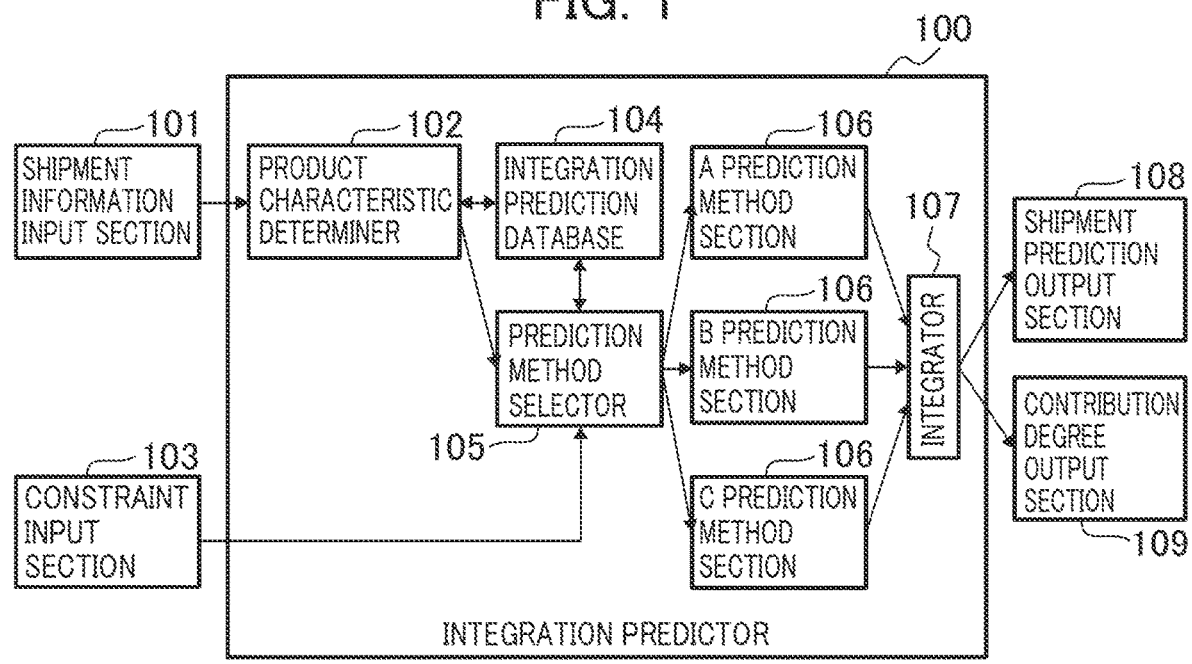
FIG. 1 is a block diagram showing a configuration of a logistics prediction system according to an embodiment of the present invention.

FIG. 1 is a block diagram showing a configuration of a logistics prediction system according to the embodiment of the present invention.

The logistics prediction system according to the embodiment includes a shipment information input section 101 to which past shipment information is input, a constraint input section 103 to which constraints for calculation are input, an integration predictor 100 that predicts a shipment volume, a shipment prediction output section 108 that outputs a result of the prediction, and a contribution degree output section 109 that outputs degrees (for example, coefficients of prediction methods in an equation described later) of contribution of prediction methods.

As exemplified in FIG. 3, shipment dates of products and the numbers of products are input as past shipment information to the shipment information input section 101 and stored in an integration prediction database 104. The information input to the shipment information input section 101 may not be the shipment dates of the products and the numbers of products that are exemplified in FIG. 3. The information input to the shipment information input section 101 may be types (refer to FIGS. 4A to 4C) of shipment patterns of the products.

Constraints necessary for calculation are input to the constraint input section 103. For example, the constraints are a constraint for a time period from the time when the calculation is started to the time when the calculation is terminated, a constraint for the number of computers available for the calculation, a constraint for a configuration such as specifications, an operational constraint such as a constraint for products to be predicted or a constraint for prediction accuracy, and the like. The products to be predicted may be represented by the ratio of the number of products to be predicted to the number of products held in stock. In addition, a shipment volume of marketable products may be predicted based on shipment volumes and the number of dates when products have been shipped. Furthermore, a shipment volume of high-margin products may be predicted. Since shipment trends vary depending on product sales units (differences between amounts of product contents, differences between product packaging shapes, for example, packages of each product, each pair of products, each dozen of products, and the like), shipment volumes may be predicted for each sales unit of products of even the same type.

The shipment prediction output section 108 outputs a prediction result output from the integration predictor 100 or a prediction result integrated by an integrator 107. The contribution degree output section 109 outputs degrees (for example, coefficients of methods) of contribution of prediction method sections 106 to the integrated prediction result.

The integration predictor 100 includes a product characteristic determiner 102, the integration prediction database 104, a prediction method selector 105, a plurality of prediction method sections 106, and the integrator 107.

The product characteristic determiner 102 determines characteristics of shipment trends of products. The product shipment trends to be analyzed by the product characteristic determiner 102 are of types shown in FIGS. 4A to 4C. The product shipment trends can be classified into FIGS. 4A to 4C. For example, FIG. 4A is an example in which shipment volumes of products are regularly changed to large and small volumes, FIG. 4B is an example in which shipment volumes of products are equal to or nearly equal to each other, and FIG. 4C is an example in which products are intermittently shipped. Since it takes time to analyze the characteristics of the shipment trends of the products, the analysis may be executed, for example, once a week, and information of the shipment trends of the products may be stored in the integration prediction database 104 and read from the integration prediction database 104 when necessary. The product characteristic determiner 102 enables shipment volumes to be accurately predicted using shipment trends of other products having similar characteristics, and especially the predicted shipment volumes are effective to predict shipment volumes of new products.

The integration prediction database 104 holds characteristics (types, shapes, sizes, and the like of products) of the products, the characteristics, determined by the product characteristic determiner 102, of the shipment trends of the products, and information of correlations between prediction methods and the characteristics of the shipment trends.

The prediction method selector 105 selects a method to be used for calculation and a method not to be used for the calculation from among multiple prediction methods and determines whether the methods are to be simplified. Specifically, the prediction method selector 105 selects, based on product-specific information output from the product characteristic determiner 102 and constraints input to the constraint input section 103, a method to be used for actual calculation and a method not to be used for the calculation from among the multiple prediction methods and defines coefficients to be used to integrate prediction results of the prediction methods. Calculation time periods required for the prediction methods and prediction accuracy are held in the integration prediction database 104. FIG. 5 shows an example of a configuration of a table in which time periods necessary for calculation to be executed using the prediction methods are recorded. FIG. 6 shows prediction accuracy when the prediction methods are applied to products. When FIGS. 5 and 6 are referenced, it is apparent that a time period for calculation to be executed using a prediction method A is long, the accuracy of executing prediction on a large number of products (shipment trends) using the prediction method A is high, and the accuracy of executing prediction on a specific product (for example, a product with a product code 4904650) with a specific shipment trend using the prediction method A is not high. It is apparent that a time period for calculation to be executed using a prediction method B is short, the accuracy of executing prediction on a large number of products (shipment trends) using the prediction method B is low, and the accuracy of executing prediction on a specific product (for example, a product with a product code 4904650) with a specific shipment trend using the prediction method B is obtained and close to the accuracy of executing the prediction on the specific product using the prediction method A. In addition, it is apparent that a time period for calculation to be executed using a prediction method C is middle, the accuracy of executing prediction on a large number of products (shipment trends) using the prediction method C is low, and the accuracy of executing prediction on the product (for example, the product with the product code 4904532) with the specific shipment trend is high. As described above, since the accuracy of prediction to be executed using the prediction methods varies depending on shipment trends of products, the prediction method selector 105 refers to tables shown in FIGS. 5 and 6 and determines a combination of prediction methods using the number of products necessary to be predicted, a time period available for calculation, time periods for calculation to be executed using the prediction methods, and the accuracy of prediction to be executed using the prediction methods.

The prediction method sections 106 calculate predicted values of shipment volumes using different prediction methods. The integrator 107 integrates output of the prediction method sections 106. For example, the prediction method sections 106 execute prediction in accordance with selection results output from the prediction method selector 105. The prediction methods are a moving average (MA) method, an autoregressive (AR) method, an autoregressive, integrated, and moving average (ARIMA) method, and the like.

The integrator 107 refers to results of calculation executed using the prediction methods, multiplies the calculation results by coefficients, and sums the results of the multiplication. For example, when prediction results obtained by prediction method sections are $P_1$, $P_2$, and $P_3$, and coefficients of the prediction methods are $\alpha$, $\beta$, and $\chi$, a prediction result obtained by integrating the prediction results can be represented by the following Equation 1.

$$P=\alpha P_1+\beta P_2+\chi P_3 \qquad (1)$$

As a method of integrating the prediction results, another known technique may be used. For example, a blend ratio described in Japanese Unexamined Patent Application Publication No. 2013-131259 may be used. An output result of the integrator 107 may be the number of shipped products or a range (for example, a range of 100 to 110) of the numbers of shipped products.

Figure 2:
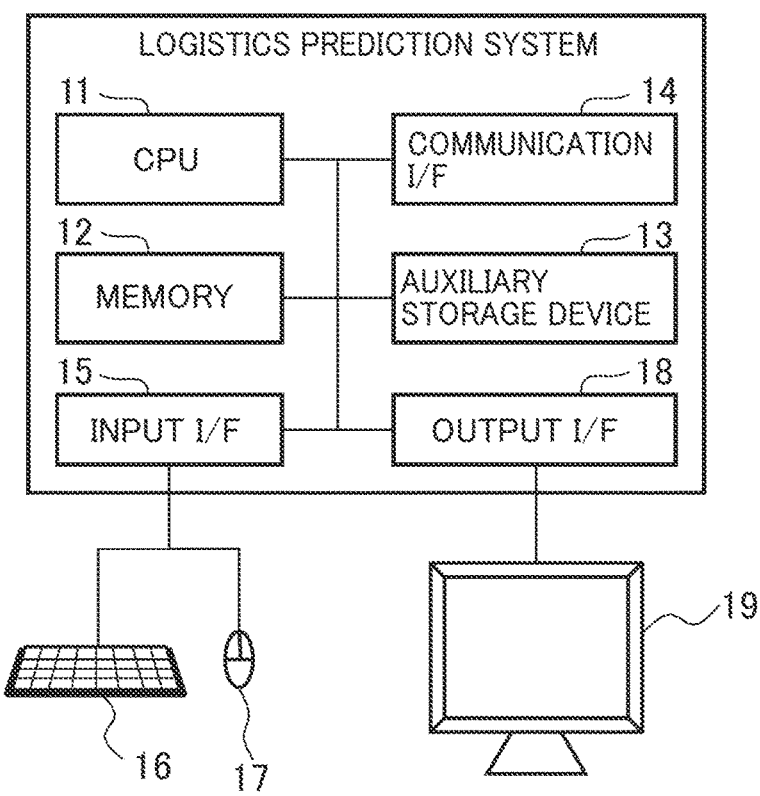
FIG. 2 is a diagram showing a physical configuration of the logistics prediction system according to the embodiment of the present invention.

FIG. 2 is a diagram showing a physical configuration of the logistics prediction system according to the embodiment of the present invention.

The logistics prediction system is constituted by a computer including a processor (CPU) 11, a memory 12, an auxiliary storage device 13, and a communication interface 14. The logistics prediction system may include an input interface 15 and an output interface 18.

The processor 11 is an arithmetic device that executes a program stored in the memory 12. Specifically, the shipment information input section 101, the product characteristic determiner 102, the constraint input section 103, the prediction method selector 105, the prediction method sections 106, the integrator 107, the shipment prediction output section 108, and the contribution degree output section 109 are enabled by causing the processor 11 to execute the program. A part of a process to be executed by causing the processor 11 to execute the program may be executed by another arithmetic device (for example, an FPGA).

The memory 12 includes a ROM and a RAM. The ROM is a nonvolatile storage element, and the RAM is a volatile storage element. The ROM stores an immutable program (for example, a BIOS). The RAM is a high-speed volatile storage element such as a dynamic random access memory (DRAM) and temporarily stores the program to be executed by the processor 11 and data to be used upon the execution of the program.

The auxiliary storage device 13 is a large-capacity nonvolatile storage device such as a magnetic storage device (HDD) or a flash memory (SSD), for example. The auxiliary storage device 13 stores the program to be executed by the processor 11 and data (for example, the integration prediction database 104) to be used by the processor 11 upon the execution of the program. Specifically, the program is read from the auxiliary storage device 13, loaded into the memory 12, and executed by the processor 11.

The communication interface 14 is a network interface device that controls communication with another device in accordance with a predetermined protocol.

The input interface 15 is connected to a keyboard 16, a mouse 17, and the like and receives input from a user. The output interface 18 is connected to a display device 19, a printer, and the like and outputs a result of executing the program in a user-visible form. A terminal connected to the logistics prediction system via a network may provide the input interface 15 and the output interface 18.

The program to be executed by the processor 11 is provided to the logistics prediction system via a removable medium (such as a CD-ROM or a flash memory) or a network and stored in the nonvolatile auxiliary storage device 13 that is a non-transitory storage medium. Thus, the logistics prediction system may include an interface that reads data from a removable medium.

The logistics prediction system may be a computer system constituted by a single physical computer or may be a computer system composed of multiple computers logically or physically configured. The logistics prediction system may operate on virtual computers built on multiple physical computer resources.

Figure 7:
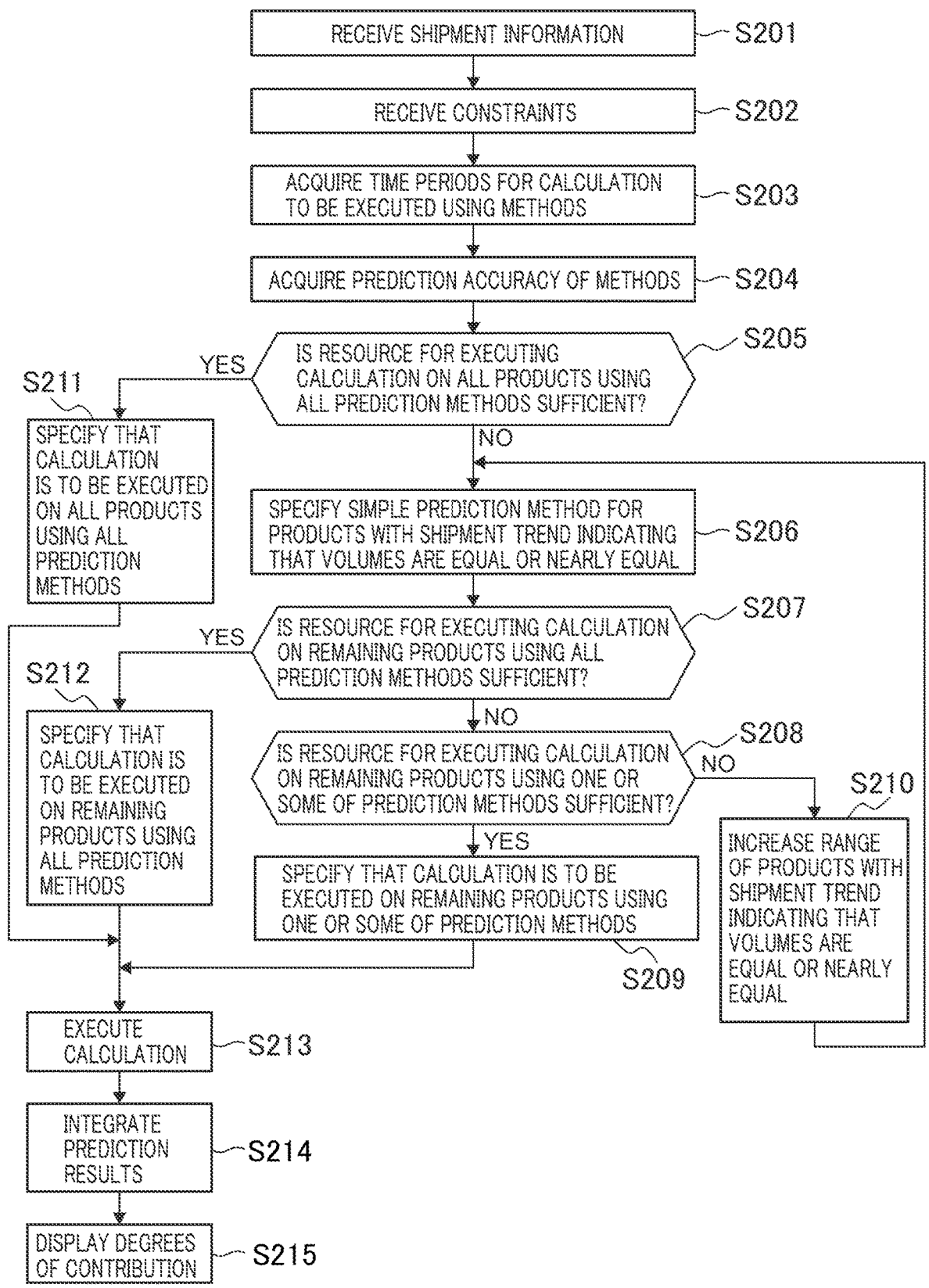
FIG. 7 is a flowchart of a process to be executed by the logistics prediction system according to the embodiment of the present invention.

FIG. 7 is a flowchart of a process to be executed by the logical prediction system according to the embodiment of the present invention.

First, the shipment information input section 101 receives input past shipment information (S201). The constraint input section 103 receives input constraints for calculation (S202). Then, the prediction method selector 105 acquires, from the integration prediction database 104, time periods for calculation to be executed using the methods (S203) and acquires, from the integration prediction database 104, the accuracy of executing prediction using the methods of predicting products to be predicted (S204). The processes from the reception (S201) of the shipment information to the acquisition (S204) of the prediction accuracy may be executed in different order from that shown in FIG. 7 or may be executed in parallel.

Then, the prediction method selector 105 uses all resources (the number of available computers and a calculation amount of the processor) input as constraints to determine whether a resource for executing calculation on all products using all the prediction methods within a time period input as a constraint in order to achieve prediction accuracy input as a constraint is sufficient for the calculation (S205). When the prediction method selector 105 determines that the prediction calculation can be executed on all the products using all the prediction methods, the prediction method selector 105 specifies that the prediction calculation is to be executed on all the products using all the prediction methods (S211). Then, the process proceeds to step S213.

On the other hand, when the prediction method selector 105 determines that the prediction calculation cannot be executed on all the products using all the prediction methods, the prediction method selector 105 extracts products whose shipment trend indicates that shipment volumes are equal to or nearly equal to each other, and specifies a simple prediction method (S206). For example, when a difference between a shipment volume of products on a current day and a shipment volume of products on a previous day is smaller than a predetermined threshold, the prediction method selector 105 determines that a shipment trend of the products indicates that shipment volumes are equal to or nearly equal to each other, and the prediction method selector 105 specifies a simple prediction method (for example, the prediction method B described with reference to FIG. 5) for which a calculation time period is short.

After that, the prediction method selector 105 determines whether a resource for executing calculation on remaining products using all the prediction methods is sufficient for the calculation (S207). When the prediction method selector 105 determines that the prediction calculation can be executed on all the remaining products using all the prediction methods, the prediction method selector 105 specifies that the prediction calculation is to be executed on all the remaining products using all the prediction methods (S212). Then, the process proceeds to step S213.

On the other hand, when the prediction method selector 105 determines that the prediction calculation using all the prediction methods is not completely executed on at least one of the remaining products, the prediction method selector 105 determines whether a resource for executing calculation on all the remaining products using one or some of the prediction methods is sufficient for the calculation (S208). In step S208, as the one or some of the prediction methods, at least one prediction methods are selected. The number of prediction methods to be selected may be determined based on a deficient resource amount. Specifically, when the deficient resource amount is large, the number of prediction methods to be selected is reduced. When the deficient resource amount is small, the number of prediction methods to be selected is increased. As a method of selecting a prediction method, a method with high prediction accuracy may be acquired from the integration prediction database 104, for example. In addition, as described with reference to FIG. 8, deviations may be calculated for the prediction methods, and a prediction method with a low deviation may be selected.

When the prediction method selector 105 determines that the prediction calculation can be executed on all the remaining products using one or some of the prediction methods, the prediction method selector 105 specifies that the prediction calculation is to be executed on all the remaining products using the one or some of the prediction methods (S209). Then, the process proceeds to step S213.

On the other hand, when the prediction method selector 105 determines that the prediction calculation cannot be executed on at least one of the remaining products using the one or some of the prediction methods, the prediction method selector 105 increases (for example, increases a threshold for determining a difference between a shipment volume on a current day and a shipment volume on a previous day) a range of products to be determined as products whose shipment trend indicates that shipment volumes are equal to or nearly equal to each other (S210). Then, the process returns to step S206. In this case, since the number of products to be calculated using a simple prediction method for which a calculation time period is short increases, an entire time period for prediction calculation can be reduced.

After that, in step S213, the prediction method sections 106 use specified prediction methods to execute calculation to predict shipment volumes of the products (S213). Then, the integrator 107 integrates prediction results obtained by the prediction method sections 106 into an integrated prediction result (S214). Then, the shipment prediction output section 108 displays the integrated prediction result, and the contribution degree output section 109 displays degrees of contribution (S215).

Figure 8:
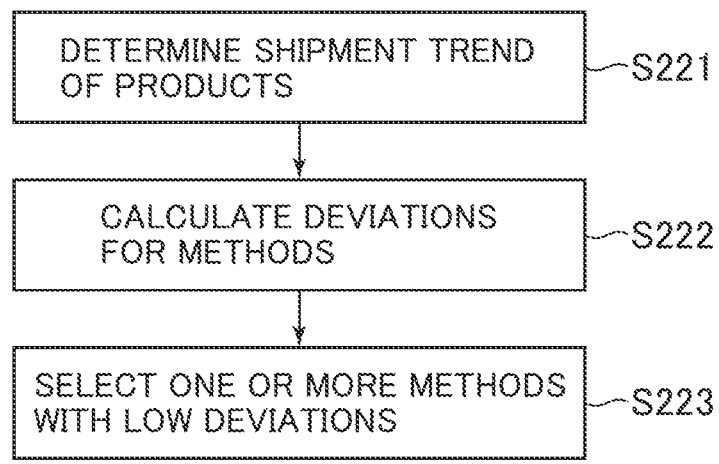
FIG. 8 is a flowchart of an example of a process of step S208 shown in FIG. 7.

FIG. 8 is a flowchart of an example of the process of step S208 shown in FIG. 7. As described above, the deviations may be calculated without the use of prediction accuracy acquired from the integration prediction database 104, and a prediction method with a low deviation may be selected.

In step S208, first, the prediction method selector 105 identifies a shipment trend of the products to be predicted (S221). The shipment trends are represented by graphs and are, for example, a shipment trend indicating that shipment volumes are equal to or nearly equal to each other, a shipment trend indicating that shipment volumes vary, a shipment trend indicating that products are intermittently shipped, and the like. When the number of days on which differences between shipment volumes of products on the days and shipment volumes of products on previous days are smaller than a predetermined threshold is large, a shipment trend of the products can be determined to be of a type indicating that shipment volumes are equal to or nearly equal to each other. When the number of days on which differences between shipment volumes of products on the days and shipment volumes of products on previous days are larger than a predetermined threshold is large, a shipment trend of the products can be determined to be of a type indicating that shipment volumes vary. When the number of days on which a shipment volume of products is 0 is large and products are regularly or irregularly shipped, a shipment trend of the products can be determined to be of a type indicating that products are intermittently shipped. Based on the determination result, a prediction method is selected.

Then, the prediction method selector 105 calculates deviations for the prediction methods of executing prediction on the products (S222). For example, a calculation model is generated using an earlier time period (for example, ⅔) of a shipment trend. The generated calculation model is used to predict a shipment volume, and a deviation (root mean square error (RMSE) or root mean square percentage error (RMSPE)) between the predicted result and a shipment volume in a later time period of the shipment trend is calculated.

After that, one or more prediction methods with small deviations are selected (S223). Generally, the moving average method is used for products of the shipment trend indicating that shipment volumes are equal to or nearly equal to each other, and the ARIMA method is used for products of the shipment trend indicating that shipment volumes vary and products of the shipment trend indicating that products are intermittently shipped.

As described above, according to the embodiment of the present invention, the logistics prediction system includes the shipment information input section 101 to which past shipment information is input, the constraint input section 103 to which a calculation resource and a calculation time period are input as constraints for prediction, the integration prediction database 104 holding shipment trends of products, the prediction method selector 105 that selects a prediction method to be used to predict a shipment volume for each of the products from among multiple prediction methods so that the constraints input to the constraint input section 103 are satisfied, the multiple prediction method sections 106 that predict shipment volumes using the multiple prediction methods, the integrator 107 that integrates the results of the prediction by the prediction method sections 106 for each of the products, and the shipment prediction output section 108 that outputs the result of the integration by the integrator 107. Thus, when shipment volumes of a large number of products are to be predicted, a prediction method appropriate for each product is selected and prediction can be executed using a calculation resource within a calculation time period with high accuracy.

The logistics prediction system also includes the contribution degree output section 109 that outputs degrees of contribution of the prediction method sections 106. Thus, the logistics prediction system can present a process of calculating shipment volumes (integration results) predicted and output and can verify the validity of the selection of a prediction method. In addition, the logistics prediction system can provide an index to be used for a user to select a prediction method.

In addition, the prediction method selector 105 determines whether a resource for executing calculation on all products, which are to be predicted, using all prediction methods within a calculation time period input as a constraint is sufficient for the calculation. When the resource is sufficient for the calculation, the prediction method selector 105 specifies that shipment volumes of all the products are to be calculated using all the prediction methods. When the resource is deficient, the prediction method selector 105 specifies that shipment volumes of products whose shipment trend indicates that shipment volumes are equal to or nearly equal to each other are to be calculated using a prediction method with a small calculation amount. Thus, a shipment volume can be calculated using a prediction method appropriate for a shipment trend of products.

Since the logistics prediction system includes the product characteristic determiner 102 that determines characteristics of shipment trends of the products, shipment volumes can be appropriately predicted based on the shipment trends of the products, and especially, a shipment volume of a new product can be accurately predicted using a shipment trend of another product having a similar characteristic.

The present invention is not limited to the aforementioned embodiment and includes various modified examples and equivalent configurations within the spirit of the appended claims. For example, the embodiment is described above in detail to clearly explain the present invention, and the present invention is not necessarily limited to the system having all the aforementioned configurations. A portion of a certain configuration among the configurations described in the embodiment may be replaced with a configuration of another embodiment. In addition, a configuration of another embodiment may be added to a certain configuration among the configurations described in the embodiment. Furthermore, a configuration of another embodiment may be added to a certain configuration among the configurations described in the embodiment, and a certain configuration among the configurations described in the embodiment may be removed or replaced with another configuration.

In addition, some or all of the configurations, the functions, the processing sections, and the like may be enabled by hardware or designed as an integrated circuit or the like or may be enabled by software by causing a processor to interpret and execute a program for enabling the functions.

The program for enabling the functions and information such as the tables and a file may be stored in a storage device such as a memory, a hard disk, or a solid state drive (SSD) or a recording medium such as an IC card, an SD card, or a DVD.

In addition, control lines and information lines that are considered to be necessary for the description are shown, and control lines and information lines that are necessary for implementation may not be necessarily shown. In fact, it may be considered that almost all configurations are connected to each other.

What is claimed is:

1. A logistics prediction system comprising:
   an arithmetic device that executes a predetermined process;
   a storage device connected to the arithmetic device;
   a shipment information input section to which past shipment information is input;
   a constraint input section to which a calculation resource and a calculation time period are input as constraints for prediction;
   an integration prediction database holding shipment trends of products;
   a prediction method selector that selects at least one prediction method to be used to predict a shipment volume from among a plurality of prediction methods for each of products to be forecasted so that the constraints input to the constraint input section are satisfied;
   a plurality of prediction method sections that predict shipment volumes using the selected at least one prediction method;
   an integrator that integrates the results of the prediction by the prediction method sections for each of the products to be forecasted; and
   a shipment prediction output section that outputs the result of the integration by the integrator,
   wherein the prediction method selector
   determines whether a resource for executing calculation on all products to be forecasted using all the prediction methods within the calculation time period input as the constraint is sufficient for the calculation;
   specifies that shipment volumes of all the products to be forecasted are to be calculated using all the prediction methods when the resource is sufficient for the calculation; and
   specifies that shipment volumes of products to be forecasted whose shipment trend indicates that shipment volumes are equal to or nearly equal to each other are to be calculated using a prediction method with a small calculation amount when the resource is deficient.

2. The logistics prediction system according to claim 1, further comprising:
   a contribution degree output section that outputs degrees of contribution of the prediction method sections.

3. The logistics prediction system according to claim 1, wherein
   the prediction method selector
   determines whether a resource for executing calculation on products to be forecasted whose shipment trend indicates that shipment volumes vary using all the prediction methods within the calculation time period input as the constraint is sufficient for the calculation;
   specifies that shipment volumes of the products to be forecasted whose shipment trend indicates that shipment volumes vary are to be calculated using all the prediction methods when the resource is sufficient for the calculation; and
   specifies that the shipment volumes of the products to be forecasted whose shipment trend indicates that shipment volumes vary are to be calculated using one or some of the selected at least one prediction method when the resource is deficient.

4. The logistics prediction system according to claim 1, further comprising:
   a product characteristic determiner that determines characteristics of shipment trends of the products to be forecasted.

5. A prediction method to be executed by a logistics prediction system including an arithmetic device that executes a predetermined process and a storage device connected to the arithmetic device, comprising:
   causing the arithmetic device to execute a shipment information acquisition procedure for acquiring past shipment information;
   causing the arithmetic device to execute a constraint acquisition procedure for acquiring a calculation resource and a calculation time period as constraints for prediction;
   causing the arithmetic device to execute a prediction method selection procedure for selecting at least one prediction method to be used to predict a shipment volume from among a plurality of prediction methods for each of products to be forecasted so that the constraints input in the constraint acquisition procedure are satisfied;

causing the arithmetic device to execute a prediction procedure for predicting shipment volumes using the selected at least one prediction method;

causing the arithmetic device to execute an integration procedure for integrating the results of the prediction by the selected at least one prediction method for each of the products to be forecasted; and causing the arithmetic device to execute a shipment prediction output procedure for outputting the result of the integration by the integration procedure, wherein in the prediction method selection procedure, the arithmetic device determines that a resource for executing calculation on all the products to be forecasted using all the prediction methods within the calculation time period input as the constraint is deficient for the calculation, the arithmetic device specifies that shipment volumes of products to be forecasted whose shipment trend indicates that shipment volumes are equal to or nearly equal to each other are to be calculated using a prediction method with a small calculation amount based on the determination.

6. The prediction method according to claim 5, further comprising:

causing the arithmetic device to execute a contribution degree output procedure for outputting degrees of contribution of the selected at least one prediction method.

7. The prediction method according to claim 5, wherein in the prediction method selection procedure, the arithmetic device determines whether a resource for executing calculation on products to be forecasted whose shipment trend indicates that shipment volumes vary using all the prediction methods within the calculation time period input as the constraint is sufficient for the calculation, the arithmetic device specifies that shipment volumes of the products to be forecasted whose shipment trend indicates that shipment volumes vary are to be calculated using all the prediction methods when the resource is sufficient for the calculation, and the arithmetic device specifies that shipment volumes of the products to be forecasted whose shipment trend indicates that shipment volumes vary are to be calculated using one or some of the selected at least one prediction method when the resource is deficient.

* * * * *